United States Patent
Park et al.

(10) Patent No.: US 10,327,119 B2
(45) Date of Patent: Jun. 18, 2019

(54) MOBILE DEVICE AND CONTROL METHOD THEREFOR

(71) Applicant: LG ELECTRONICS INC., Seoul (KR)

(72) Inventors: Minho Park, Seoul (KR); Jeongkyo Seo, Seoul (KR); Jaesung Lee, Seoul (KR); Juhnho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/739,021

(22) PCT Filed: Dec. 2, 2015

(86) PCT No.: PCT/KR2015/013059
§ 371 (c)(1),
(2) Date: Dec. 21, 2017

(87) PCT Pub. No.: WO2017/010632
PCT Pub. Date: Jan. 19, 2017

(65) Prior Publication Data
US 2018/0192266 A1     Jul. 5, 2018

(30) Foreign Application Priority Data

Jul. 10, 2015   (KR) .......................... 10-2015-0098171

(51) Int. Cl.
*H04N 5/00*        (2011.01)
*H04W 4/40*       (2018.01)
(Continued)

(52) U.S. Cl.
CPC ................. *H04W 4/40* (2018.02); *H02J 7/02* (2013.01); *H02J 7/025* (2013.01); *H04B 5/0037* (2013.01);
(Continued)

(58) Field of Classification Search
CPC ......... H04W 4/40; H04W 4/80; H04W 88/06; H04W 88/04; H04W 4/00; H02J 7/025; H02J 7/02
(Continued)

(56) References Cited

U.S. PATENT DOCUMENTS

2013/0281141 A1   10/2013  Rubin et al.
2014/0073254 A1*   3/2014  Ichihara ................. G07C 5/008
                                                              455/41.2
(Continued)

FOREIGN PATENT DOCUMENTS

KR         10-1534866 B1      7/2015

*Primary Examiner* — Ayodeji O Ayotunde
(74) *Attorney, Agent, or Firm* — Birch, Stewart, Kolasch & Birch, LLP

(57) ABSTRACT

The present invention relates to: a vehicle capable of providing a wireless vehicle communication (V2X) service by using a mobile terminal without comprising a wireless communication module; a control method therefor; and a mobile terminal for the same. A method by which a mobile terminal provides V2X, related to one embodiment of the present invention, can comprise the steps of: acquiring, by the mobile terminal, vehicle information from a vehicle through near-field communication (NFC); and relaying V2X data between individuals outside of the vehicle by using a mobile communication module on the basis of the acquired vehicle information.

18 Claims, 7 Drawing Sheets

(51) Int. Cl.
*H02J 7/02* (2016.01)
*H04W 88/04* (2009.01)
*H04W 88/06* (2009.01)
*H04W 4/80* (2018.01)
*H04B 5/00* (2006.01)
*H02J 7/00* (2006.01)

(52) U.S. Cl.
CPC ............. *H04W 4/80* (2018.02); *H04W 88/04* (2013.01); *H04W 88/06* (2013.01); *H02J 7/0047* (2013.01)

(58) Field of Classification Search
USPC ........................................................ 455/41.1
See application file for complete search history.

(56) References Cited

U.S. PATENT DOCUMENTS

| | | | |
|---|---|---|---|
| 2014/0142783 A1* | 5/2014 | Grimm | .................... G06F 17/00 701/2 |
| 2015/0005981 A1 | 1/2015 | Grimm et al. | |
| 2015/0187146 A1* | 7/2015 | Chen | ....................... G07C 5/008 701/31.5 |
| 2018/0035276 A1* | 2/2018 | Kang | .................... H04W 8/005 |

* cited by examiner

MOBILE DEVICE AND CONTROL METHOD THEREFOR

CROSS REFERENCE TO RELATED APPLICATIONS

This application is the National Phase of PCT International Application No. PCT/KR2015/013059, filed on Dec. 2, 2015, which claims priority under 35 U.S.C. 119(a) to Patent Application No. 10-2015-0098171, filed in the Republic of Korea on Jul. 10, 2015, all of which are hereby expressly incorporated by reference into the present application.

TECHNICAL FIELD

The present invention relates to a vehicle capable for providing wireless vehicle (V2X) communication services using a mobile terminal without a wireless communication module, control method thereof, and mobile terminal therefor.

BACKGROUND ART

In recent years, wireless vehicle (V2X) communication has attracted attention as the next-generation smart-vehicle technology. The wireless vehicle (i.e., vehicle-to-everything (V2X)) communication can include all types of communication technologies related to autonomous and safe driving, which can be applied to vehicles on the roads, infrastructure, etc.

FIG. 1 is a conceptual diagram illustrating the concept of wireless vehicle communication.

Referring to FIG. 1, the V2X technology can include vehicle-to-vehicle (V2V) communication, vehicle-to-infrastructure (V2I) communication, and vehicle-to-pedestrian (V2P) communication. If information exchange among vehicles, pedestrians, and infrastructure is achieved, it is possible to prevent traffic accidents or provide various convenient functions.

According to the report of 'ICT Brief (2015-9 issue)' posted in ITFIND managed by National IT Industry Promotion Agency (NIPA), the global V2X market is expected to ship about 19 million devices and achieve a penetration rate of 16% in 2020.

To implement the V2X technology in a vehicle, a global positioning system (GPS) device for determining a location of the vehicle and a wireless communication module (e.g., LTE modem) for exchanging data with other entities should be mounted on the vehicle. However, there are the following problems: the installation of such devices increases the prices of vehicles, and it is not easy to install the corresponding devices in vehicles before the V2X technology is introduced.

DISCLOSURE OF THE INVENTION

Technical Task

The object of the present invention is to provide a vehicle capable of providing wireless vehicle (V2X) communication services using a mobile terminal without a wireless communication device mounted thereon, mobile terminal therefor, and control method thereof.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a method for providing vehicle wireless communication by a mobile terminal, including: obtaining, by the mobile terminal, vehicle information from a vehicle through near field communication (NFC); and relaying vehicle wireless communication (V2X) data between the vehicle and an external entity using a mobile communication module based on the obtained vehicle information.

In another aspect of the present invention, provided herein is a mobile terminal, including: a short-range communication module configured to obtain vehicle information; a mobile communication module; and a controller configured to control the mobile communication module to relay vehicle wireless communication (V2X) data between a vehicle and an external entity based on the obtained vehicle information.

Advantageous Effects

According to the present invention, since a mobile terminal relays wireless communication between a vehicle for providing wireless vehicle (V2X) communication services and an external entity, the vehicle where a wireless communication device is not installed can provide the V2X communication services.

It will be appreciated by persons skilled in the art that the effects that can be achieved through the present invention are not limited to what has been particularly described hereinabove and other advantages of the present invention will be more clearly understood from the following detailed description.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Before explaining V2X Service embodiment, a mobile terminal and vehicle structure are described.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 2A:
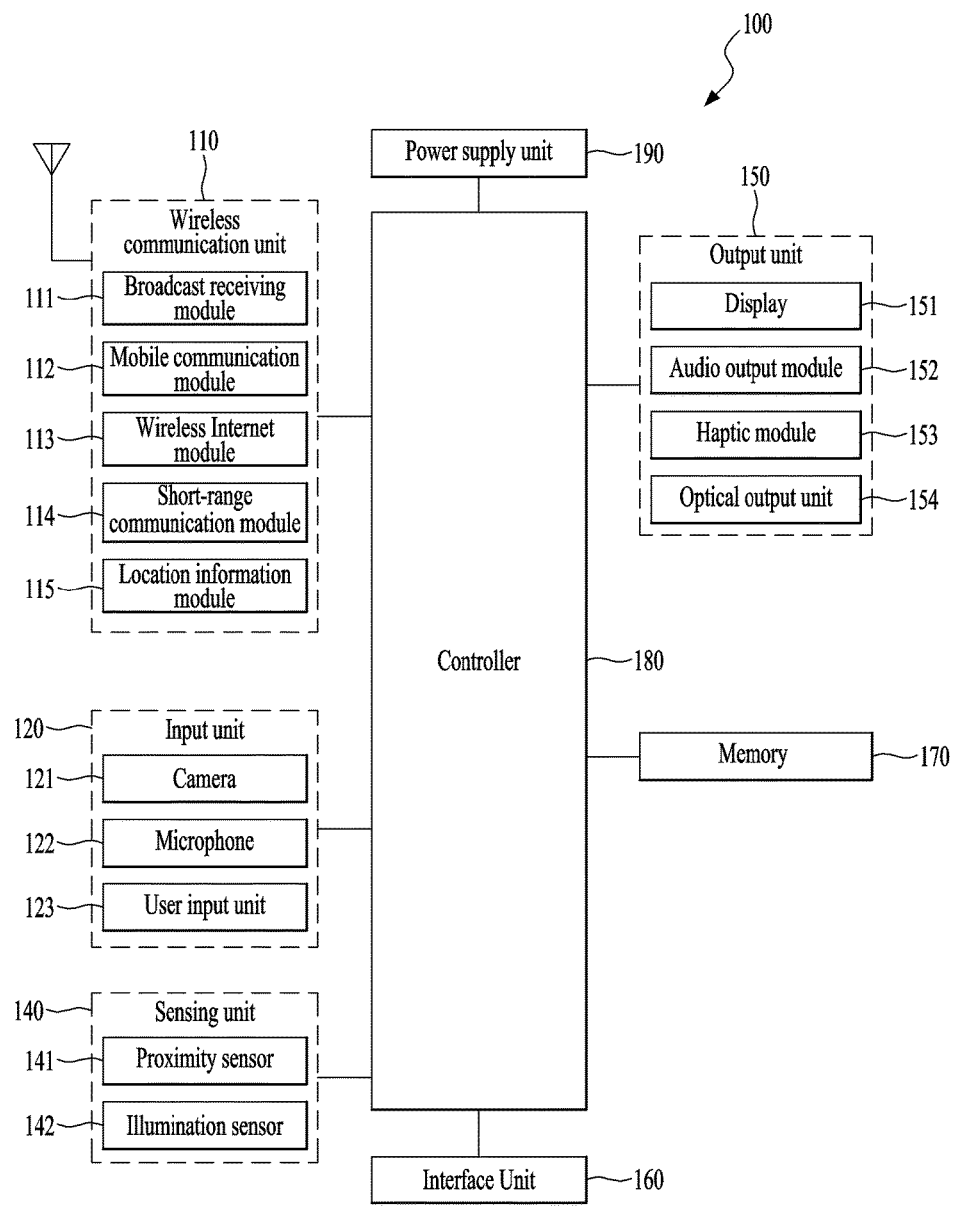
FIG. 2A is a block diagram for explaining a mobile terminal according to the present invention.
Figure 2B:
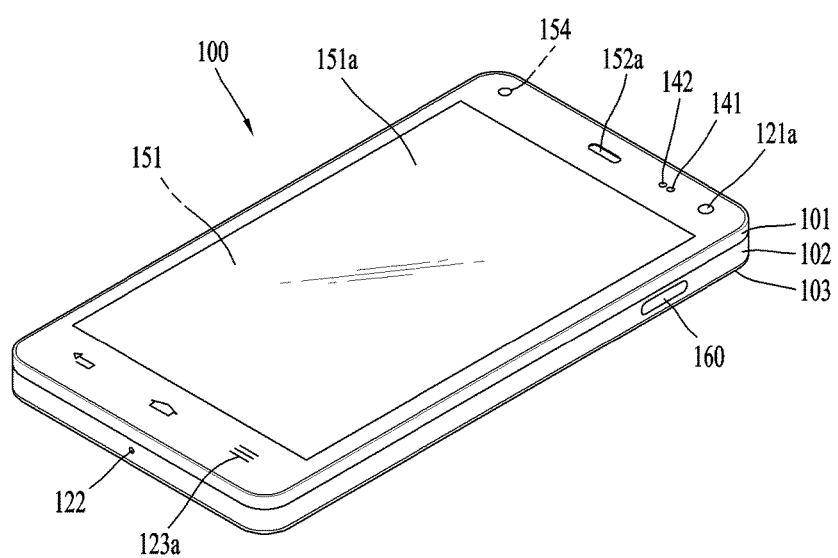
FIGS. 2B and 2C are conceptual views of the mobile terminal according to the present invention, viewed from different directions.
Figure 2C:
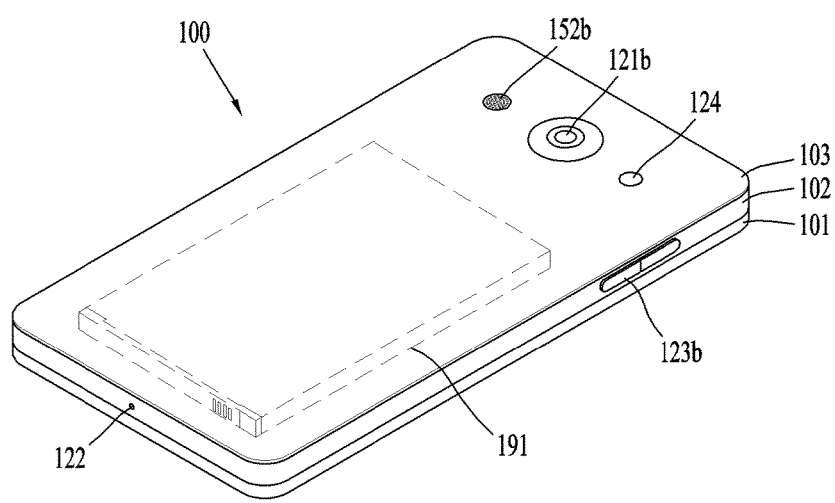

Reference is now made to FIGS. 2A-2C, where FIG. 2A is a block diagram of a mobile terminal in accordance with the present disclosure, and FIGS. 2B and 2C are conceptual views of one example of the mobile terminal, viewed from different directions.

Figure 1:
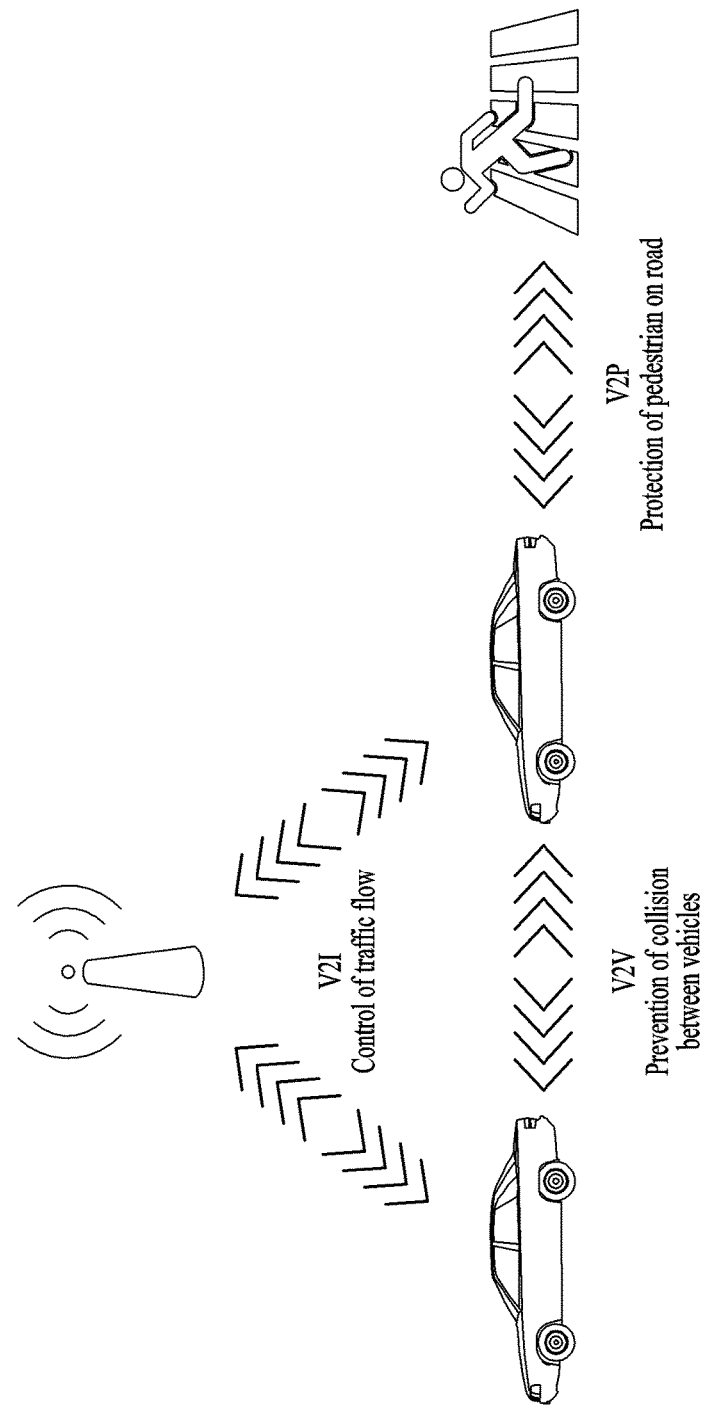
FIG. 1 is a conceptual diagram illustrating the concept of wireless vehicle communication.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 2A, or activating application programs stored in the memory 170. As one example, the controller 180 controls some or all of the components illustrated in FIG. 2A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Broadcast management server indicates that a server that can generate and transmit broadcast signal and broadcast information to the terminal.

Broadcast information can indicate broadcast channel, broadcast program, and the information related to the broadcast service provider.

Referring still to FIG. 2A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2B and 2C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 2B and 2C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 3:
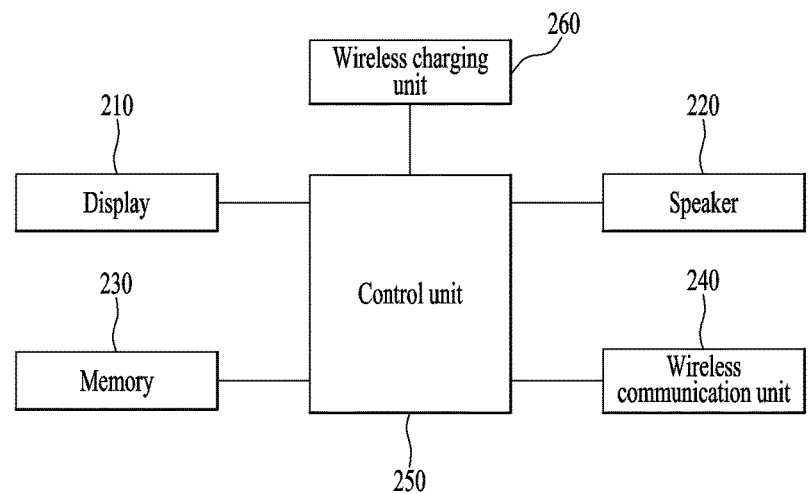
FIG. 3 is a block diagram illustrating the configuration of a head unit system in a vehicle according to an embodiment of the present invention.

FIG. 3 is a block diagram illustrating the configuration of a head unit system in a vehicle according to an embodiment of the present invention.

Referring to FIG. 3, the head unit system 200 of the vehicle can include a display 210 for display navigation map information, or image and event information of multimedia contents, a speaker 220 for outputting a sound generated when multimedia is played or when a navigation function is executed, a memory 230 for storing navigation map information, multimedia contents, configuration information, and the like, a wireless communication unit 240 for exchanging event-related information, control signals, contents, and the like by being wirelessly connected to mobile terminals of passengers in the vehicle, and a controller 250 for controlling the above-described components and performing determination and operation required for embodiments of the present invention.

For example, the controller 250 can control overall processes for implementing a wireless data path with a mobile terminal. In addition, when the vehicle is wirelessly connected to the mobile terminal, the controller 250 can control operation required for providing V2X services, which will be described later, and control signal transmission and reception processes.

In addition, the display 210 may be combined with a touch sensor to implement a touch screen. Although not shown in the drawing, the display 210 may further include a microphone for receiving a voice signal from a passenger and/or a user input unit for receiving a command.

Moreover, the head unit system 200 may include a wireless charging unit 260 for wirelessly charging a mobile terminal according to an embodiment of the present invention. Of course, if necessary, the wireless charging unit 260 can be implemented as a component independent from the head unit system 200, and in this case, the wireless charging unit 260 can exchange control signals with the head unit system 200 through CAN communication.

Further, an NFC module may be provided to the wireless charging unit 260 at a position corresponding to an NFC module of the mobile terminal so that the wireless charging unit 260 can perform NFC communication with the mobile terminal when the mobile terminal is placed thereon for wireless charging.

Figure 4:
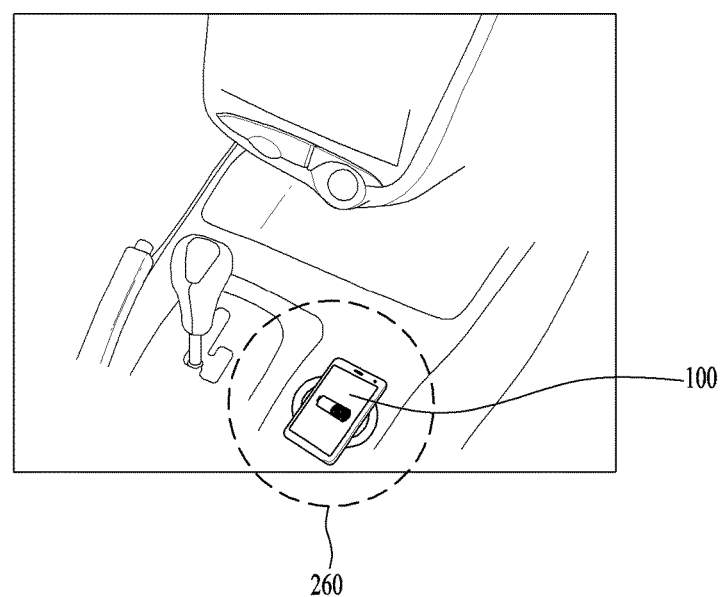
FIG. 4 illustrates an example in which the mobile terminal according an embodiment of the present invention is placed on a wireless charging unit.

FIG. 4 illustrates an example in which the mobile terminal according an embodiment of the present invention is placed on a wireless charging unit.

Referring to FIG. 4, the wireless charging unit 260 can be disposed on a certain portion of the center fascia of the vehicle (next to the gear lever). This is merely an example, and the wireless charging unit 260 can be disposed at various locations, for example, in the vicinity of the display 210 of the head unit, in the vicinity of the dashboard, on the armrest of the driver's seat.

In the wireless charging unit 260 shown in FIG. 4, a groove that matches the housing of the mobile terminal 100 can be formed so that the mobile terminal is fixed to the wireless charging unit 260. In addition, the NFC module may be disposed in the inside of the groove so that the wireless charging unit 260 can perform NFC communication with the mobile terminal during wireless charging.

In this case, since only the mobile terminal placed on the groove of the wireless charging unit can perform NFC communication even if there are a plurality of mobile terminals in the vehicle, a process for discovering a mobile terminal that will participate in V2X service provision is not required separately. In addition, since the mobile terminal is fixed to the groove, stable NFC communication can be achieved.

Hereinafter, a description will be given of a method for providing V2X services at a vehicle using a mobile terminal according to an embodiment of the present invention. Generally, to provide V2X services, a vehicle needs to obtain its position information using a GPS and exchange wireless data related to the V2X services with an external entity using a mobile communication module.

To overcome this problem, the present invention proposes that a vehicle uses a GPS and mobile communication module (e.g., LTE modem) of a mobile terminal to provide V2X services even when the vehicle does not have its own GPS and mobile communication module. That is, the mobile terminal plays a role of relaying data related to the V2X services between the vehicle and an external entity using its GPS and mobile communication module.

Figure 5:
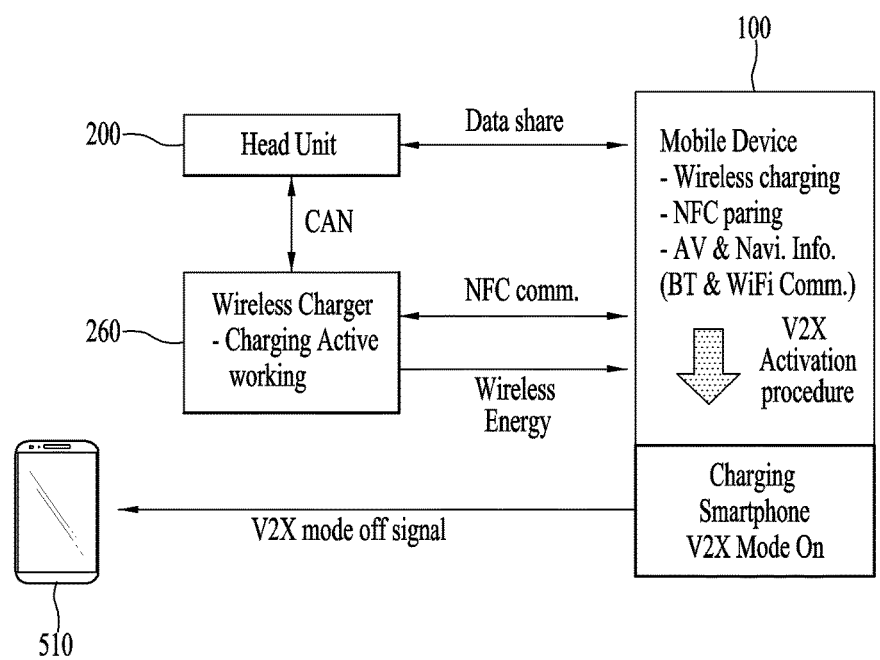
FIG. 5 is a conceptual diagram illustrating a method for providing V2X services at a vehicle using the mobile terminal according to an embodiment of the present invention.

FIG. 5 is a conceptual diagram illustrating a method for providing V2X services at a vehicle using the mobile terminal according to an embodiment of the present invention.

Referring to FIG. 5, the head unit 200 of the vehicle can be paired with the mobile terminal 100 through Bluetooth for the hand-free function or through Wi-Fi connection for the vehicle connectivity function such as MirrorLink and thus exchange data with the mobile terminal 100.

When the mobile terminal 100 is placed on the wireless charging module 260 for wireless charging, the wireless charging can be started, and at the same time, the mobile terminal 100 can perform NFC communication with the head unit through the NFC module included in the wireless charging module 260. When the charging is started (or when it is detected that the mobile terminal is placed on the wireless charging unit (or module)), the head unit transmits information necessary for providing V2X services through CAN communication to the NFC module.

After receiving vehicle information though the short-range communication module 114, the mobile terminal may be configured to operate in V2X mode to relay data necessary for V2X services to an external entity using the GPS 115 and mobile communication module 113. The data to be relayed to the external entity can be exchanged between the vehicle and mobile terminal through the NFC communication. When the mobile terminal is detached from the wireless charging module and thus the NFC communication is disabled, data exchange can be performed through Bluetooth or Wi-Fi.

In this case, the V2X mode for the mobile terminal/vehicle may be WAVE (IEEE P1609), and the data relay may be performed based on Dedicated Short Range Communication (DSRC). Meanwhile, when the mobile terminal operates in the V2X mode, it is possible to instruct a different mobile terminal 500 in the vehicle to disable the V2X mode to prevent that the different mobile terminal 500 operates in the V2X mode.

When the wireless charging is terminated, that is, when the mobile terminal is detached from the wireless charging unit, the head unit may maintain the V2X mode until the ignition is turned off and the vehicle door opens because the user intends to stop the charging only.

Figure 6:
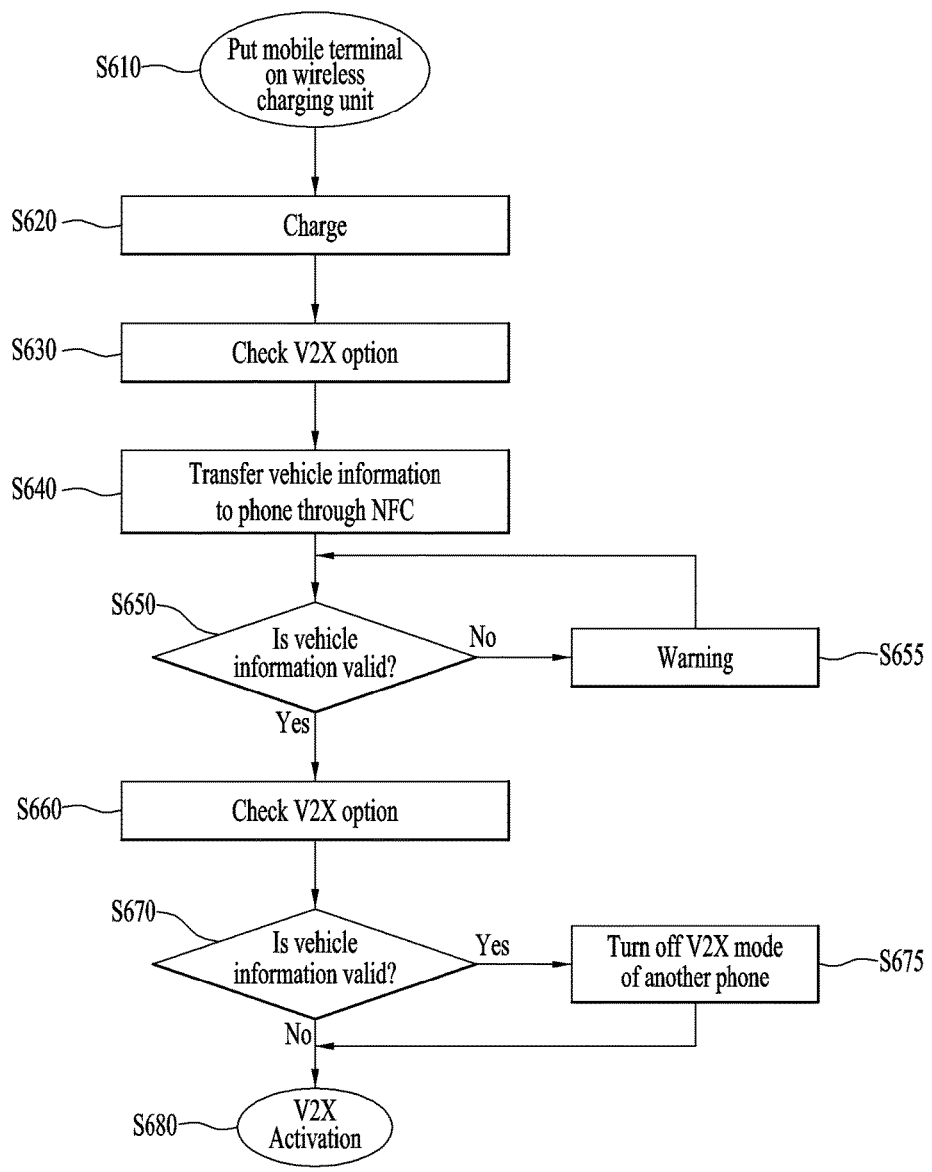
FIG. 6 illustrates processes for providing V2X services through the mobile terminal according to an embodiment of the present invention.

The processes described with reference to FIG. 5 can be summarized as shown in FIG. 6.

FIG. 6 illustrates processes for providing V2X services through the mobile terminal according to an embodiment of the present invention Referring to FIG. 6, the mobile terminal 100 is placed on the wireless charging module 260 of the vehicle [S610]. The wireless charging module 260 of the vehicle senses that the mobile terminal 100 is placed thereon and then start charging [S620].

In this case, if necessary, the head unit can check whether an option for using V2X services through the mobile terminal is enabled [S630].

Thereafter, the head unit transmits information of the vehicle to the mobile terminal through the NFC module [S640]. In this case, the transmitted vehicle information may include information on whether the vehicle uses the V2X mode, information on whether the vehicle has a GPS/mobile communication module for V2X services, information on access to an alternative wireless communication means prepared for disabled NFC communication caused by detachment of the mobile terminal from the wireless charging module (e.g., BD address of the vehicle, Wi-Fi MAC address, access password, etc.).

The mobile terminal can check whether the received vehicle information is valid for the V2X mode activation (e.g., whether the V2X mode can be used, and whether there is no mobile communication modem) [S650]. When the vehicle information is not valid, the mobile terminal can display a warning message [S655].

When the vehicle information is valid, the mobile terminal activates the V2X mode for relaying the V2X related data to an external entity using its mobile communication module either automatically or according to a user's input command [S660].

In this case, the data to be transmitted to the external entity may be obtained through an OBU (On Board Unit) OBD of the vehicle, and the obtained information may be transmitted to the head unit or NFC module through the CAN communication. Examples of the obtained information may include: 1) driving information such as the number of wheel rotations, the acceleration rate of the vehicle and the like, 2) information on operation of safety devices such as sudden brake operation, ABS, ESP (Electronic Stability Program), and the like, and 3) extra information such as operation of the vehicle's wipers and the like.

Meanwhile, when the mobile terminal operates in the V2X mode, the mobile terminal searches for other mobile terminals in the vehicle using Wi-Fi or BT by being given the authority to operating as the V2X mode master to prevent interference from other mobile terminals [S670].

When other terminals are detected, the mobile terminal instructs the detected terminals to disable the V2X mode [S675].

Thereafter, the mobile terminal and vehicle can operate in the V2X mode until the ignition is turned off and the door at the driver's seat opens. In addition, when the mobile terminal is detached from the wireless charging module, the mobile terminal and vehicle can exchange the V2X related data through the alternative communication means (e.g., Wi-Fi, BT, etc.) instead of the NFC communication.

Figure 7:
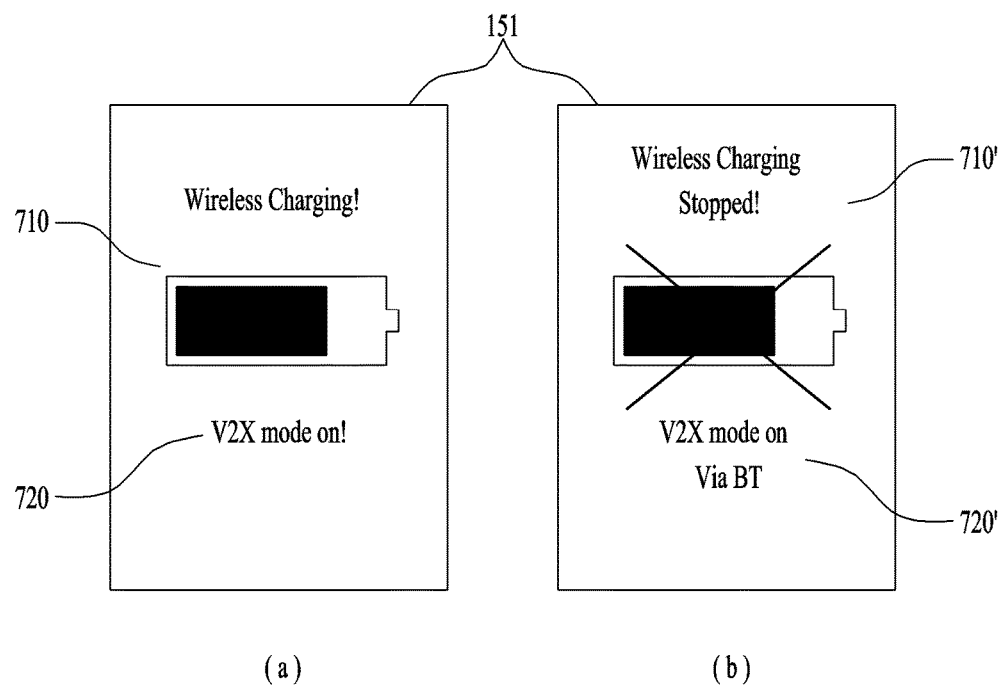
FIG. 7 illustrates examples of information displayed on the mobile terminal according to an embodiment of the present invention while the mobile terminal operates in a V2X mode.

FIG. 7 illustrates examples of information displayed on the mobile terminal according to an embodiment of the present invention while the mobile terminal operates in the V2X mode.

Referring to FIG. 7 (a), while operating in the V2X mode, the mobile terminal may display, on the display 151, information 710 on a charging state and information 720 indicating that the V2X mode is activated.

If it is detected that the mobile terminal is detached from the wireless charging module of the vehicle, the mobile terminal may display, on the display 151, charging state information 710' indicating that wireless charging is stopped and information 720' indicating that V2X related data is exchanged through an alternative communication means. Additionally, the mobile terminal can also inform the user of the detachment through vibration or sound.

The above-mentioned control method can be implemented in a program recorded medium as computer-readable codes. The computer-readable media may include all kinds of recording devices in which data readable by a computer system are stored. Examples of the computer-readable media may include HDD (Hard Disk Drive), SSD (Solid State Disk), SDD (Silicon Disk Drive), ROM, RAM, CD-ROM, magnetic tapes, floppy disks, optical data storage devices, and the like.

In addition, the computer-readable media may also include carrier-wave type implementations (e.g., transmission via Internet). Further, the computer may include the controller 180 of the terminal.

Thus, the above embodiments are to be considered in all respects as illustrative and not restrictive. The scope of the invention should be determined by reasonable interpretation of the appended claims and all change which comes within the equivalent scope of the invention are included in the scope of the invention.

MODE FOR INVENTION

Various embodiments have been described hereinabove with reference to the best mode for implementing the present invention.

INDUSTRIAL APPLICABILITY

The present invention can be applied to various mobile devices.

It is apparent to those skilled in the art that various modifications and changes may be made without departing from the spirit and scope of the present invention. Accordingly, the present invention is intended to include the modifications and changes of the present invention within the attached claims and the equivalent scope.

What is claimed is:

1. A method for providing vehicle wireless communication by a mobile terminal, the method comprising:
obtaining, by the mobile terminal, vehicle information from a vehicle;
relaying vehicle wireless communication (V2X) data between the vehicle and an external entity using a mobile communication module based on the obtained vehicle information; and
automatically relaying V2X data when the obtained vehicle information indicates that a mobile communication module for V2X services is not mounted on the vehicle.

2. The method of claim 1, wherein the vehicle comprises a wireless charging module,
wherein the wireless charging module comprises an NFC module configured to perform NFC communication with the mobile terminal when the mobile terminal is placed on the wireless charging module, and
wherein the mobile terminal is configured to obtain the vehicle information through the NFC module disposed on the wireless charging module.

3. The method of claim 2, wherein the relayed V2X data is exchanged with the vehicle through the NFC module and a short-range communication module of the mobile terminal.

4. The method of claim 1, further comprising:
detecting different peripheral terminals; and
instructing at least one different terminal selected based on the detection result to deactivate V2X operation.

5. The method of claim 1, wherein relaying comprises performing dedicated short-range communication (DSRC) for the V2X data.

6. The method of claim 1, wherein the obtained vehicle information comprises at least one of information on whether V2X mode is used, information on whether a mobile communication module is mounted, and access information of an alternative wireless communication means prepared for a situation in which the NFC communication is disabled.

7. The method of claim 6, wherein the access information of the alternative wireless communication means comprises a Bluetooth device (BD) address of the vehicle, a Wi-Fi media access control (MAC) address, and an access password.

8. The method of claim 6, further comprising, when the NFC communication is disabled, relaying the V2X data using the access information of the alternative wireless communication means.

9. The method of claim 8, further comprising displaying the situation in which the NFC communication is disabled and the access information of the alternative wireless communication means on a display unit.

10. A mobile terminal, comprising:
a short-range communication module configured to obtain vehicle information;
a mobile communication module; and
a controller configured to:
cause the mobile communication module to relay vehicle wireless communication (V2X) data between a vehicle and an external entity based on the obtained vehicle information, and
cause the mobile communication module to automatically relay the V2X data when the obtained vehicle information indicates that a mobile communication module for V2X services is not mounted on the vehicle.

11. The mobile terminal of claim 10, wherein the vehicle comprises a wireless charging module,
wherein the wireless charging module comprises an NFC module configured to perform NFC communication with the mobile terminal when the mobile terminal is placed on the wireless charging module, and
wherein the mobile terminal is configured to obtain the vehicle information through the NFC module disposed on the wireless charging module.

12. The mobile terminal of claim 11, wherein the relayed V2X data is exchanged with the vehicle through the NFC module and the short-range communication module of the mobile terminal.

13. The mobile terminal of claim 10, further comprising a wireless Internet module, wherein the controller is configured to detect different peripheral terminals through the wireless Internet module and instruct at least one detected different terminal to deactivate V2X operation.

14. The mobile terminal of claim 10, wherein the controller is configured to perform dedicated short-range communication (DSRC) for the V2X data using the mobile communication module.

15. The mobile terminal of claim 10, wherein the obtained vehicle information comprises at least one of information on whether V2X mode is used, information on whether a mobile communication module is mounted, and access information of an alternative wireless communication means prepared for a situation in which the NFC communication is disabled.

16. The mobile terminal of claim 15, wherein the access information of the alternative wireless communication means comprises a Bluetooth device (BD) address of the vehicle, a Wi-Fi media access control (MAC) address, and an access password.

17. The mobile terminal of claim 15, wherein when the NFC communication is disabled, the controller is configured to relay the V2X data using the access information of the alternative wireless communication means.

18. The mobile terminal of claim 17, further comprising a display unit, wherein the controller is configured to cause the display unit to display the situation in which the NFC communication is disabled and the access information of the alternative wireless communication means.

* * * * *